Patented July 20, 1948

2,445,648

UNITED STATES PATENT OFFICE 2,445,648

METHOD OF PRODUCING POWDERED METAL

Edward Cushman Truesdale, Palmerton, Pa., assignor to The New Jersey Zinc Company, New York, N. Y., a corporation of New Jersey No Drawing. Application May 13, 1944, Serial No. 535,555

7 Claims. (Cl. 75—34)

This invention relates to the reduction of iron oxide and has for its object the provision of an improved method of forming powdered iron from iron oxide. The invention is directed to the production of powdered iron by reduction of iron oxide in reaction with hydrogen and aims to provide an improved method of reducing various forms of iron oxide with greater facility and without an excessive amount of "fines," and producing a reduced sponge iron that is friable and easily ground to the desired particle size. Iron powder thus obtained can be used for iron powder metallurgy.

Iron oxides of the types generally available for use in practicing the invention occur in two principal forms; the ferric oxides ($Fe_2O_3$) such as hematite ore and chemical iron oxide usually formed as a pigment by precipitation, and the magnetic oxides ($Fe_3O_4$) such as magnetite ore and mill scale. The pigment type ferric oxide resulting from precipitation is easily reducible with hydrogen but the particles of iron are usually so fine that there is an excessive loss of iron powder. In reducing such iron oxide at, say, 900° C., the iron in the form of sponge is so mildly sintered that grinding the sponge gives an undesirably fine powder. Attempts to overcome this by reducing at a higher temperature to obtain more thorough sintering have not been successful because of severe sintering and shrinkage resulting in a dense sponge iron which cannot be ground to powder because of shot formation. The magnetic oxides, especially the refractory forms of mill scale, are difficult to reduce with hydrogen and may require such high temperatures that the resulting reduced iron, though never fused, may be so thoroughly coalesced or sintered that shot formation results upon milling. Moreover, certain forms of mill scale have a tendency to exfoliate and swell during reduction, probably as a result of their laminar structure. Sponge iron reduced from mill scale which exfoliates and swells is very soft and even gentle milling results in the formation of excessive fines. It is difficult or impossible to mill the powder so as to obtain the combination of bulk density, flowing characteristics and size distribution desired for purposes of powder metallurgy.

The invention aims to overcome the aforementioned difficulties and, to this end, provides an improved method comprising the agglomeration of iron oxide into pellets or briquets (hereinafter called "pellets"), the roasting of the pellets under oxidizing conditions and at a temperature which causes sintering of the particles in the pellets without fusion, and the reduction of the roasted pellets with hydrogen below the temperature causing shot formation. I have found it advantageous to carry out the reduction of the roasted and sintered pellets at temperatures varying from 550° C. to 1025° C. When reduction is effected at temperatures from 550° C. to 600° C. the reduced iron is pyrophoric and I raise the temperature to at least 700° C. for a sufficient time to inactivate the iron.

In accordance with the invention, the iron oxide is mixed with a suitable binder and agglomerated into pellets. If the pellets of the oxides are made without a binder, they are too weak to permit handling, and incorporation of a binder is necessary to obtain good green strength. Because a high purity iron powder is desired, the binder should add no significant impurity to the iron.

The agglomerated pellets are dried and subjected to a roasting operation at a temperature sufficiently high to cause sintering of the particles in the pellets. The drying operation may be an integral part of the roasting operation. In the roasting operation of the invention, oxidizable impurities in the charge, such as sulfur and carbon, are oxidized and removed, the fine particles are caused to grow into larger particles by sintering and, if the oxide be in the form of magnetite, it will be oxidized at least in part to the more easily reducible ferric oxide. Roasting of a refractory mill scale or magnetite renders it more easily reducible. Roasting, or preferably agglomerating and roasting, also destroys or at least minimizes the tendency of mill scale to swell or exfoliate during reduction, so that subsequent control of powder properties by milling is made possible. The roasting of pellets or briquets of any of the oxides described results in the formation of hard, strong agglomerates and, probably as a result of this initial sintering action, almost no sintering together of the agglomerates occurs during the reduction step. Such roasted pellets do not adhere either to each other or to a stainless steel retort when subjected to reduction. In consequence, they will flow smoothly by gravity through a vertical retort of appropriate dimensions made of standard types of heat resistant nickel-chromium steels and the like.

The severity of the roasting treatment is determined by the results to be accomplished. Adequate briquet strength may be obtained in two hours at 1100° C. Elimination of swelling from mill scale may require three hours at 1150° C. The roasting treatment for the conditioning of chemical iron oxide will depend upon the properties of the raw material, as will the treatment to improve the reducibility of a refractory mill scale or magnetite. Burning out of carbon and sulfur probably depends more upon the access of air to the roast than upon time or temperature of roasting. While the roasting will convert the magnetic oxides to ferric oxide, the desired results are usually obtained before oxidation is complete. Thus, the weight loss upon reduction in hydrogen is 27.6 per cent for pure $Fe_3O_4$ and 30.1 per cent for pure $Fe_2O_3$. A well-roasted magnetite or mill scale will normally show a hydrogen weight loss of 29.0 to 29.6 per cent.

The roasted agglomerated particles are subjected to reduction with hydrogen at any suitable temperature but below that temperature at which coalescence becomes too severe to permit subsequent milling to powder. The roasted agglomerated particles have sufficient coherence, as a result of the sintering during roasting, that the reduced iron is in a friable state and largely in the form of the original pellets with a substantial absence of the fines that would result from reducing the oxide without agglomerating and roasting. Notwithstanding the coherence of the reduced pellets, they may be ground and screened to the desired size and without forming an excessive amount of fines.

In carrying out a method of the invention, the iron oxide in any of the forms herein described, and usually in a finely divided form, is admixed with any suitable agglomerating agent, and then pressed into molds forming pellets or briquets. It has been found that from 1 to 5 per cent, based on the weight of the iron oxide, of sulfite liquor is a satisfactory binder. Other binders in similar percentages, such as molasses, dextrin, sugar and the like, may also be used. These pellets have sufficient green strength to withstand handling and will not disintegrate when packed into the usual roasting furnace. The pellets may be of any size which will prevent excessive packing and insure the circulation of oxidizing gas throughout the charge and may, for example, vary in size anywhere from ½ inch to 1 inch in diameter. They may be packed into vertical retorts, tubes, shaft furnaces, or passed through an ordinary metallurgical roasting furnace. The roasting operation is carried out under strongly oxidizing conditions, preferably with an excess of air, and the charge is heated to a temperature in the neighborhood of 1000° to 1150° C. for two or three hours depending upon the form of the iron oxide. 1000° C. is adequate for certain precipitated iron oxides. In the case of extremely fine and fluffy precipitated iron oxides it may be desirable to apply a preliminary roasting treatment at say 1000° C. before mixing with a binder, agglomerating and roasting the agglomerates. As a result of the high temperature and strong oxidizing conditions, the particles of the charge are sintered together and the oxidizable portions of the agglomerating agent, as well as any sulphur or carbon which may be in the charge, are substantially burned away. The roasted pellets are preferably substantially in the form of ferric oxide, free of oxidizable impurities, and the fine particles are sintered or bonded together.

The roasting furnace may be of such construction that the reduction with hydrogen may be carried out therein. Such a furnace should be provided with charging and unloading means which may be sealed and with means to flush out any free oxygen which may be in the charge or furnace with an inert gas, such as nitrogen, before admitting the hydrogen. The roasted pellets may be transferred to a special reducing furnace of any type which may be sealed to prevent access of oxygen and which may be easily flushed out with the inert gas. The roasted charge, whether in the roasting furnace or in the reducing furnace, is heated to, or maintained at, a reduction temperature which may vary from 550° C. to 1025° C., and hydrogen is admitted in sufficient quantity to combine with all the oxygen of the iron oxide in the charge. Precipitated or chemical iron oxide can be reduced rapidly at 900° C. Magnetite or mill scale requires 1000° C. and temperatures up to 1025° C. can be tolerated. Substantially higher temperatures are undesirable because of the risk of severe sintering, interfering with subsequent milling or grinding operations. The hydrogen may be in a fairly pure form, or it may be in the form of water gas, especially hydrogen-rich water gas. If iron of low carbon content is desired, the reduced charge should be cooled by hydrogen or nitrogen in the absence of carbon monoxide, and in any case cooling should be effected in the absence of oxidizing gases. The charge may be cooled in the reduction furnace, or it may be transferred to another chamber while in contact with hydrogen, or with nitrogen, wherein it is permitted to cool. While any suitable form of hydrogen may be used for reduction, I prefer to cool the reduced sponge iron in contact with fairly pure hydrogen. Ordinary commercial hydrogen may be sufficiently purified by conventional methods such as bringing the gas into adequate contact with copper turnings heating to about 400° C. and with caustic soda.

While the reduced pellets are in the form of friable sponge iron, substantially in the pellet shape, they have sufficient cohesion between the particles of iron that they may be ground without the formation of an excessive amount of fine iron powder. The iron pellets or briquets may be ground to any desired extent in any suitable apparatus such as a gyratory crusher or cone crusher followed by a ball or rod mill or a disc pulverizer, and screened to separate the desired size of iron particles. Final milling to control bulk density, flow characteristics, and size distribution may be done in a Mikropulverizer or Stedman type disintegrator.

I claim:

1. In the production of iron powder by reduction of iron oxide with hydrogen, the improvement which comprises mixing the iron oxide with a binder and forming agglomerated pellets thereof, subjecting the pellets to a roasting operation under strongly oxidizing conditions and at a temperature not exceeding about 1150° C., said roasted pellets being substantially free of oxidizable impurities, subjecting the roasted pellets to reduction with hydrogen at a temperature not to exceed 1025° C. to reduce the iron oxide to iron and leave it in a friable condition, and grinding the reduced iron to the desired particle size.

2. In the production of iron powder by reduction of iron oxide with hydrogen, the improvement which comprises mixing the iron oxide with a binder and forming agglomerated pellets thereof, charging the pellets into a vertical retort, subjecting the pellets to a roasting operation under strongly oxidizing conditions and at a temperature not exceeding about 1150° C., said roasted pellets being substantially free of oxidizable impurities, subjecting the roasted pellets to reduction with hydrogen at a temperature not to exceed 1025° C. to reduce the iron oxide to iron and leave it in a friable condition, and grinding the reduced iron to the desired particle size.

3. In the production of powdered iron by reduction of iron oxide, the steps which comprise charging pellets of the iron oxide into the upper portion of a vertical retort, subjecting the pellets to a roasting operation in a strongly oxidizing atmosphere at a temperature sufficiently high to sinter the particles in the pellets without causing the pellets to adhere to each other sufficiently to result in sticking and bridging of the charge in the retort, said temperature not exceeding about 1150° C., then, at the conclusion of the roasting operation, flushing out the retort with an inert gas, and introducing hydrogen into the retort to reduce the iron oxide to iron, the reduction being carried out at a temperature within the range of 550° C. to 1025° C.

4. In the production of powdered iron by reduction of iron oxide, the steps which comprise charging pellets of the iron oxide into the upper portion of a vertical retort, subjecting the pellets to a roasting operation at a temperature in the range of 1000° C. to 1150° C., said roasting operation causing the particles in the pellets to be sintered without causing the pellets to adhere to each other sufficiently to result in sticking and bridging of the charge in the retort, then, at the conclusion of the roasting operation, flushing out the retort with an inert gas, and introducing hydrogen into the retort to reduce the iron oxide to iron, the reduction being carried out at a temperature within the range of 550° C. to 1025° C.

5. In the production of powdered iron from iron oxide, the improvement which comprises forming agglomerated pellets from the iron oxide, roasting the pellets at a sufficiently elevated temperature not exceeding about 1150° C. and with sufficient oxygen to burn out most of the sulphur and carbon and sinter the particles together in the pellets, reducing the pellets to iron with hydrogen at a temperature of from 550° C. to 900° C., converting the pellets to a friable sponge iron in the form of the pellets, and grinding the iron pellets to the desired particle size.

6. In the production of powdered iron from iron oxide, the improvement which comprises forming agglomerated pellets from the iron oxide, roasting the pellets at a sufficiently elevated temperature not exceeding about 1150° C. and with sufficient oxygen to burn out most of the sulphur and carbon and sinter the particles together in the pellets, reducing the pellets to iron with hydrogen at a temperature of from 550° C. to 600° C., and heating the reduced iron to a temperature of at least 700° C. to change the iron from a pyrophoric to a stable form.

7. In the production of powdered iron from magnetic oxide, the improvement which comprises forming agglomerated pellets from the oxide, roasting the pellets at a temperature in the range of 1100° C. to 1150° C. and with sufficient oxygen to convert the magnetic oxide to ferric oxide, burn out sulfur and carbon and sinter the pellets; reducing the roasted pellets with hydrogen to iron at a temperature in the range of 550° C. to 600° C., heating the reduced iron to a temperature of at least 700° C. to change the iron from a pyrophoric to a stable form, and grinding the iron to obtain particles of the desired size.

EDWARD CUSHMAN TRUESDALE.

REFERENCES CITED

The following references are of record in the file of this patent:

UNITED STATES PATENTS

| Number | Name | Date |
| --- | --- | --- |
| 183,691 | Lyttle | Oct. 24, 1876 |
| 1,481,357 | Dwight | Jan. 22, 1924 |
| 1,865,554 | Bradley | July 5, 1932 |
| 1,979,729 | Brown | Nov. 6, 1934 |
| 2,065,618 | Sherwood | Dec. 29, 1936 |
| 2,197,085 | Stuart | Apr. 16, 1940 |
| 2,346,034 | Kraner | Apr. 4, 1944 |
| 2,351,765 | Jeffery | June 20, 1944 |
| 2,367,262 | Brassert | Jan. 16, 1945 |

OTHER REFERENCES

Comprehensive Treatise on Inorganic and Theoretical Chemistry, vol. 12, page 768. Published by Longmans, Green and Co., London, England.